US00RE48533E

(19) United States
(12) Reissued Patent
Rosenberg et al.

(10) Patent Number: US RE48,533 E
(45) Date of Reissued Patent: Apr. 27, 2021

(54) DISPLAY PANEL OR PORTION THEREOF WITH A CHANGEABLE GRAPHICAL USER INTERFACE COMPONENT

(71) Applicant: Google LLC, Mountain View, CA (US)

(72) Inventors: Greg Rosenberg, San Mateo, CA (US); William Wayne Woodworth, San Franciso, CA (US)

(73) Assignee: GOOGLE LLC, Mountain View, CA (US)

(21) Appl. No.: 29/723,371

(22) Filed: Feb. 6, 2020

Related U.S. Patent Documents

Reissue of:
(64) Patent No.: Des. 736,785
Issued: Aug. 18, 2015
Appl. No.: 29/455,656
Filed: May 23, 2013

U.S. Applications:
(60) Continuation of application No. 29/661,970, filed on Aug. 31, 2018, now Pat. No. Re. 47,881, which is a
(Continued)

(51) LOC (13) Cl. ..... 14-04
(52) U.S. Cl.
USPC ..... D14/485
(58) Field of Classification Search
USPC ..... D14/485–495; D18/26, 31, 32, 33; D20/11, 12, 23, 24, 25, 29, 30, 31, 32, D20/36, 37, 38
(Continued)

(56) References Cited

U.S. PATENT DOCUMENTS 5,957,559 A * 9/1999 Rueb et al. ..... G05B 19/41805 353/28
D705,798 S * 5/2014 Lim et al. ..... D14/486
(Continued)

*Primary Examiner* — Darlington Ly
(74) *Attorney, Agent, or Firm* — Leason Ellis LLP

(57) CLAIM

The ornamental design for a display panel or portion thereof with a changeable graphical user interface component, as shown and described.

DESCRIPTION

FIG. 1 is a front view of a display panel or portion thereof with a changeable graphical user interface ("UI") component, comprising a first image in a sequence;
FIG. 2 is a front view of a second image included in the sequence;
FIG. 3 is a front view of a third image included in the sequence;
FIG. 4 is a front view of a fourth image included in the sequence;
FIG. 5 is an enlarged front view of the left side of FIG. 1, up to the curved broken-away line to show details at a larger scale; and,
FIG. 6 is an enlarged front view of the left side of FIG. 2, up to the curved broken-away line to show details at a larger scale.
[The subject matter in this patent includes a process or period during which a computer icon image changes into another image. This] *The appearance of the changeable graphical user interface sequentially transitions between the images shown in FIGS. 1-4. The* process or period in which one [computer icon] image transitions [into] *to* another *image* forms no part of the claimed design.
The curved broken-away lines indicate break lines and the appearance of any portion of the article between the break lines forms no part of the claimed design. The large broken lines surrounding the user interface in the figure drawings represent portions of a display panel and form no part of the claimed design. The [small] broken lines represent portions of the user interface and form no part of the claimed design.

1 Claim, 2 Drawing Sheets

Figure 1:
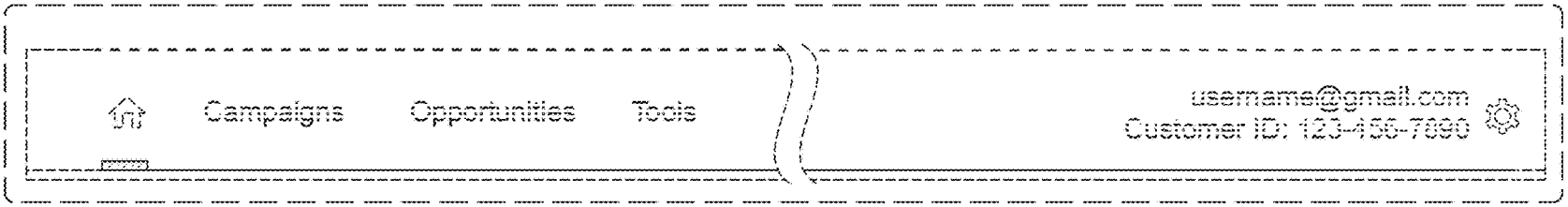
Figure 2:
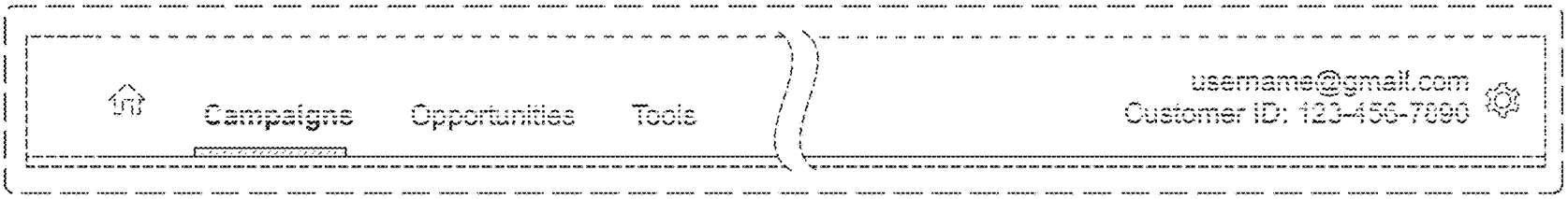
Figure 3:
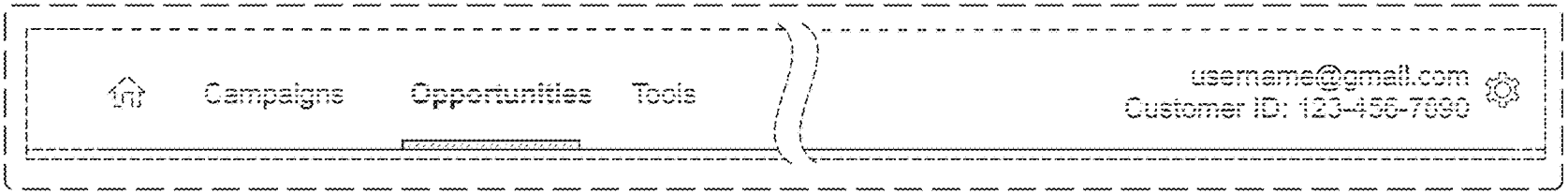
Figure 4:
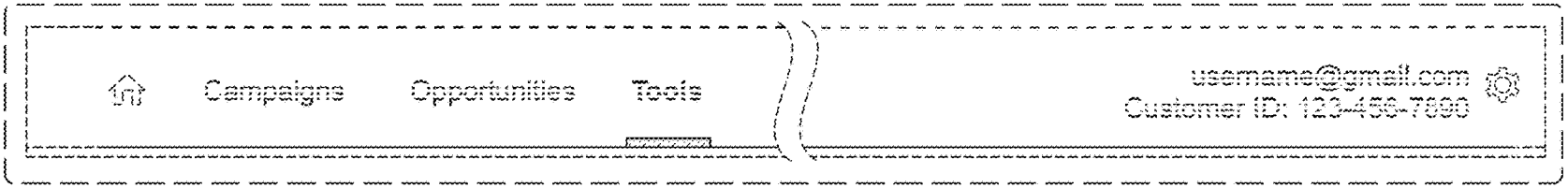
Figure 5:
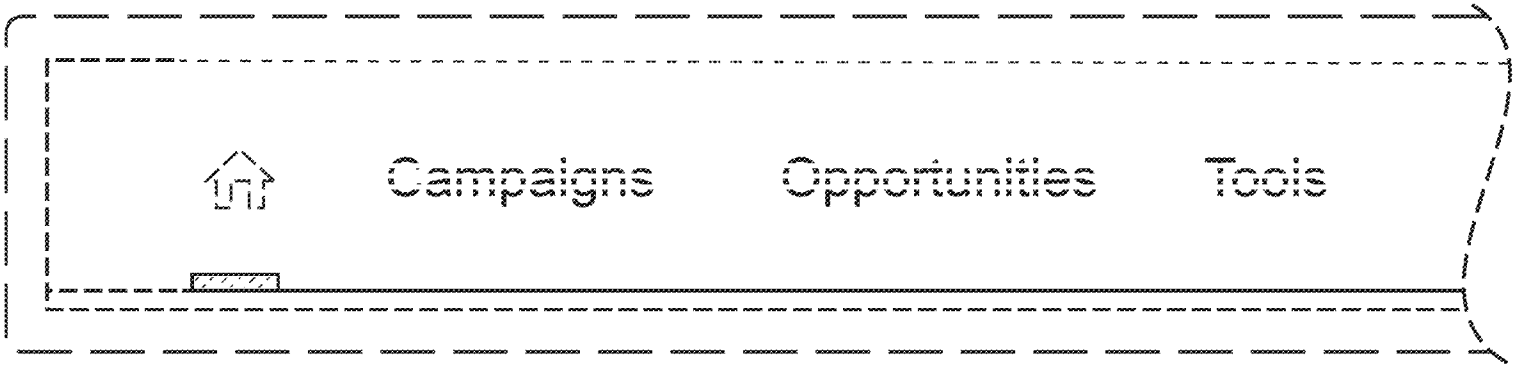
Figure 6:
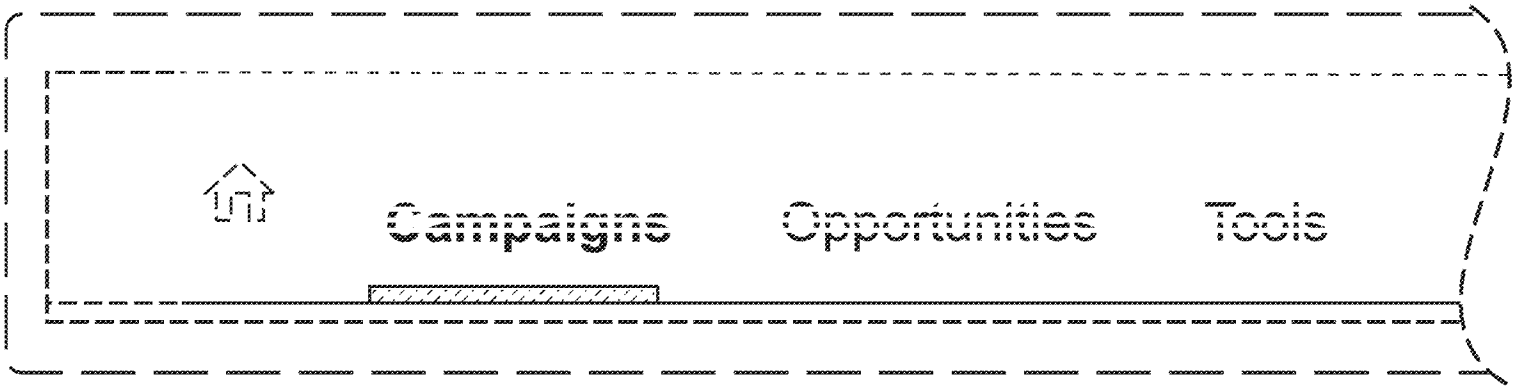

Matter enclosed in heavy brackets [ ] appears in the original patent but forms no part of this reissue; matter printed in italics indicates the additions made by reissue.

Campaigns Opportunities Tools
usernamemail@gmail.com
Customer ID: 123-456-7890

Related U.S. Application Data division of application No. 29/614,296, filed on Aug. 17, 2017, now Pat. No. Re. 47,283, which is an application for the reissue of Pat. No. Des. 736,785.

(58) Field of Classification Search

CPC ..... G06F 3/048; G06F 3/0481; G06F 3/0482; G06F 3/04817; G06F 3/04812

See application file for complete search history.

(56) References Cited

U.S. PATENT DOCUMENTS 8,842,085 B1 * 9/2014 Goodspeed et al. ..... G06F 16/487 345/173
D718,323 S * 11/2014 Hwang et al. ..... D14/486
D759,038 S * 6/2016 Kadosh ..... D14/485
D771,073 S * 11/2016 Choi ..... D14/485
D782,508 S * 3/2017 Ouilhet ..... D14/486
D790,566 S * 6/2017 Ouilhet ..... D14/486
D791,152 S * 7/2017 Ouilhet ..... D14/486
2005/0122315 A1 * 6/2005 Chalk et al. ..... H04M 1/72469 345/173
2005/0131856 A1 * 6/2005 O'Dea ..... H04N 5/232
2011/0291985 A1 * 12/2011 Wakako et al. ..... G06F 3/04817 345/174
2011/0310048 A1 * 12/2011 Ramarao et al. ... G06F 3/04817 345/173
2012/0173659 A1 * 7/2012 Thaxter et al. ..... G06F 15/0291 709/217
2012/0226979 A1 * 9/2012 Harberts et al. .... G06F 3/04847 715/702
2013/0027736 A1 * 1/2013 Kittaka ..... G06F 3/1257 358/1.14
2013/0235271 A1 * 9/2013 Kasuga et al. ..... H04N 21/4312 348/569
2014/0189597 A1 * 7/2014 Kang ..... G06F 3/04817 715/835
2014/0215340 A1 * 7/2014 Shetty et al. ..... G06F 3/0488 715/727
2014/0304730 A1 * 10/2014 Lettau et al. ..... H04N 5/91 725/32

* cited by examiner